US012700990B2

(12) United States Patent
Leveque et al.

(10) Patent No.: US 12,700,990 B2
(45) Date of Patent: Aug. 4, 2026

(54) METHOD FOR SECURING AN EXECUTION OF A CRYPTOGRAPHIC PROCESS

(71) Applicant: THALES DIS FRANCE SAS, Meudon (FR)

(72) Inventors: Sylvain Leveque, Niort (FR); Michael Adjedj, Creteil (FR)

(73) Assignee: THALES DIS FRANCE SAS, Meudon (FR)

( * ) Notice: Subject to any disclaimer, the term of this patent is extended or adjusted under 35 U.S.C. 154(b) by 181 days.

(21) Appl. No.: 18/028,290

(22) PCT Filed: Jul. 30, 2021

(86) PCT No.: PCT/EP2021/071459
§ 371 (c)(1),
(2) Date: Mar. 24, 2023

(87) PCT Pub. No.: WO2022/063468
PCT Pub. Date: Mar. 31, 2022

(65) Prior Publication Data
US 2024/0064002 A1 Feb. 22, 2024

(30) Foreign Application Priority Data

Sep. 25, 2020 (EP) ..................................... 20315419

(51) Int. Cl.
*H04L 9/00* (2022.01)
*H04L 9/06* (2006.01)
(52) U.S. Cl.
CPC ........ *H04L 9/0631* (2013.01); *H04L 2209/08* (2013.01)

(58) Field of Classification Search
CPC ... H04L 9/0631; H04L 2209/08; H04L 9/003; H04L 9/005
See application file for complete search history.

(56) References Cited

U.S. PATENT DOCUMENTS

| 10,644,873 | B2* | 5/2020 | Wurcker | ............... H04L 9/0631 |
| 2018/0212761 | A1* | 7/2018 | Bilgin | ................... H04L 9/0861 |
| 2019/0342070 | A1* | 11/2019 | Deng | .................. G06F 21/6218 |

(Continued)

OTHER PUBLICATIONS

International Search Report (PCT/ISA/220) and Written Opinion (PCT/ISA/237) mailed on Oct. 29, 2021, by the European Patent Office as the International Searching Authority for current International Application No. PCT/E P2021/071 459—[14 pages].

(Continued)

*Primary Examiner* — Syed M Ahsan

(57) ABSTRACT

The present disclosure relates to a method for securing an execution of an algorithm of a cryptographic process comprising several operations Oj with n,j integers and j in [0 . . . n−1], to be executed each once for a complete execution of said algorithm and which may be executed independently, said method being performed by a processor of a cryptographic device and comprising, for one execution of said algorithm, repeating the following steps, until each of said several operations has been executed at least once:

drawing at random an operation to be executed among all several operations comprised in the algorithm, executing said drawn operation.

9 Claims, 2 Drawing Sheets

(56)            References Cited

U.S. PATENT DOCUMENTS

| | | | |
|---|---|---|---|
| 2020/0044821 A1* | 2/2020 | Lopez Hernandez | ...................... |
| | | | H04L 9/0631 |
| 2020/0412523 A1* | 12/2020 | Tunstall | ............... H04L 9/0625 |

OTHER PUBLICATIONS

Veyrat-Charvillon Nicolas et al: "Shuffling against Side-Channel Attacks: A Comprehensive Study with Cautionary Note", Dec. 2, 2012 (Dec. 2, 2012), Big Data Analytics in the Social and Ubiquitous Context : 5th International Workshop on Modeling Social Media, MSM 2014, 5th International Workshop on Mining Ubiquitous and Social Environments, Muse 2014 And First International Workshop on Machine Le, XP047328912, ISBN: 978-3-642-17318-9 pp. 740,744.

Ali Galip Bayrak et al: "An architecture-independent instruction shuffler to protect against side-channel attacks", ACM Transactions on Architecture and Code Optimization, vol. 8, No. 4, Jan. 1, 2012 (Jan. 1, 2012) , pp. 1-19, XP055110086, ISSN: 1544-3566, DOI: 10.1145/2086696.2086699 sections 3, 4.5; figures 1,2b.

\* cited by examiner

Fig. 3

METHOD FOR SECURING AN EXECUTION OF A CRYPTOGRAPHIC PROCESS

FIELD OF USE

The present invention relates to the field of software obfuscation, and more particularly to a method for securing the execution of a cryptographic algorithm in a whitebox context.

BACKGROUND

A typical example of a sensitive operation is a cryptographic process. Cryptographic processes are frequently used for protecting data, such as messages exchanged on a communication channel, from being accessed by an unauthorized user by encrypting it. Such processes are also used for authenticating the issuer of a message to ensure he is who he claims to be, for example.

Among such processes, block cipher algorithms such as AES are widely used. Such processes operate on blocks of data and usually perform several rounds of encryption.

In order to keep such processes secure, the secret keys used by such processes must remain secret, otherwise any attacker having knowledge of the secret key could decipher a ciphertext and the privacy of enciphered data would not be guaranteed anymore. Such an attacker could also generate forged signatures of a message as if he was the true owner of the secret key.

Traditionally, in order to ensure that the secret key remains secret, the decryption or signature algorithm is supposed to be executed in a secure environment only. The device executing such an algorithm is assumed trusted, preventing any attacker trying to decipher a secret message from accessing to the secret key.

However, cryptographic processes are more and more deployed in applications executed on open devices. For example many user devices now have access to the Internet, such as PCs, tablets, smartphones, and can be used for playing copyrighted digital content such as audio or video files. Such files may be cryptographically protected, for example using digital rights management (DRM), in order to make it available to a user only as long as the user has subscribed to an online multimedia streaming service.

Cryptographic processes are then executed in an environment where not all users or devices can be trusted. Such a context is usually called a white-box attack context, as the attacker has full access to the software implementation of the cryptographic processes. Binary code of such processes is completely accessible and editable by the attacker that can analyze the binary code of the cryptography application and, for example, memory pages or registers used for temporary storage during the execution. Such manipulation may, for example, be performed using debuggers and software or hardware emulation tools.

Cryptographic processes such as block cipher algorithms can usually be broken down into repeated rounds performing each several independent operations. In order to keep the secret key secret in a whitebox environment, obfuscation methods have been developed that replace such operations using the secret key by accesses to lookup tables (LUT). By doing so, an attacker monitoring the execution of a cryptographic process cannot spot anymore any access to the secret key. Nevertheless, such an attacker may spot when each operation is performed and gain enough information from monitoring accesses to the corresponding LUT for finally retrieving the secret concealed in such LUTs.

Cryptographic processes have been proposed in which such operations are performed in a random order in order to confuse an attacker and make it harder to determine at each moment of the execution of such processes which LUT is being accessed. Nevertheless, attackers already found a way to overcome such a protection and to retrieve the secret key anyway.

Therefore, there is still a need for a method enabling a secure execution of a sensitive operation among a plurality of other independent sensitive operations in a white-box environment.

SUMMARY

For this purpose and according to a first aspect, this invention therefore relates to a method for securing an execution of an algorithm of a cryptographic process comprising several operations $O_j$ with n,j integers and j in $[0 . . . n-1]$, to be executed each once for a complete execution of said algorithm and which may be executed independently, said method being performed by a processor of a cryptographic device and comprising, for one execution of said algorithm, repeating the following steps, until each of said several operations has been executed at least once:

drawing at random an operation to be executed among all several operations comprised in the algorithm, executing said drawn operation.

By doing so, the algorithm execution is made chaotic which prevents an attacker from predicting an order of execution of the operations, which makes it difficult for an attacker to target a specific operation of the algorithm.

In an embodiment, the step of executing said drawn operation may comprise:

when said drawn operation has never been executed yet since the beginning of execution of said algorithm, executing said drawn operation and saving an output of said execution, when said drawn operation has already been executed since the beginning of execution of said algorithm, executing said drawn operation and discarding the output of said execution or saving the output of said execution instead of a previous result of a previous execution of said drawn operation.

In an embodiment of the invention, said cryptographic device comprises further a random number generator and a memory configured for storing counters, and comprising, at the beginning of an execution of said algorithm, for each of said operations $O_j$, setting to zero a counter of a number of executions of said operation, and wherein:

drawing at random an operation to be executed comprises generating a random index in $[0 . . . n-1]$, using said random number generator and, executing said drawn operation comprises executing an operation whose index is equal to said generated index and incrementing said counter of the number of executions of said operation, wherein each of said several operations has been executed at least once when all counters are different from zero.

In an embodiment of the invention, said cryptographic device comprises further a random number generator and a memory configured for storing counters, and comprising, at the beginning of an execution of said algorithm, for each of said operations $O_j$, setting to zero a counter of a number of executions of said operation, and wherein:

drawing at random an operation to be executed comprises generating a random index in [0 . . . n−1], using said random number generator and, executing said drawn operation comprises executing an operation whose index is equal to said generated index and incrementing said counter of the number of executions of said operation only when said operation has never been executed yet since the beginning of execution of said algorithm, wherein, all counters being concatenated into a binary value, each of said several operations has been executed at least once when said binary value is equal to a predetermined binary value composed only of digits equal to 1.

These two embodiments enable to easily keep track of which operation has been executed and to determine after each operation execution if all the operations have been executed at least once or not.

Said method may comprise a step of, when a predetermined number of executions of operations have been performed, executing all operations among said several operations which have not been executed yet since the beginning of execution of said algorithm.

It enables to limit the number of operation executions before the algorithm has been completely executed, which prevents excessive execution time for the algorithm.

All operations among said several operations which have not been executed yet since the beginning of execution of said algorithm may be executed in a random order or a predetermined order.

Said algorithm of a cryptographic process may be a block cipher algorithm and said several operations may be operations of a round of said block cipher algorithm.

For example, said operations are among Sboxes and Tboxes.

According to a second aspect, this invention therefore relates also to a computer program product directly loadable into the memory of at least one computer, comprising software code instructions for performing a method according to the first aspect when said computer program product is run on the at least one computer.

According to a third aspect, this invention therefore relates also to a non-transitory computer readable medium storing executable computer code that when executed by a cryptographic device comprising a processor, performs the method according to the first aspect.

According to a fourth aspect, this invention therefore relates also to a cryptographic device comprising a processor configured to execute a method according to the first aspect.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

FIG. 3 illustrates an example of multiple executions of an algorithm according to the method of the invention.

DETAILED DESCRIPTION

The invention aims at securing the execution of an algorithm of a cryptographic process comprising several operations which may be executed independently by making it impossible for an attacker to predict at some point of the execution which operation is being executed and what will be the next operation to be executed. By doing so, it becomes much more difficult for the attacker to attack the execution of a given operation in the course of the execution of the whole algorithm.

In order to do so, the invention teaches during the execution of the algorithm, after the execution of an operation, to draw at random the next operation to be executed, and to execute it anyhow, disregarding the fact that it may already have been executed since the beginning of the execution of the algorithm. As a result any operation may be executed several times even if only one execution of it is required for executing the whole algorithm. Thus, the execution becomes chaotic: the number of execution of each operation is random, the execution length of the whole algorithm is random and the order of execution of the operations is random.

Figure 1:
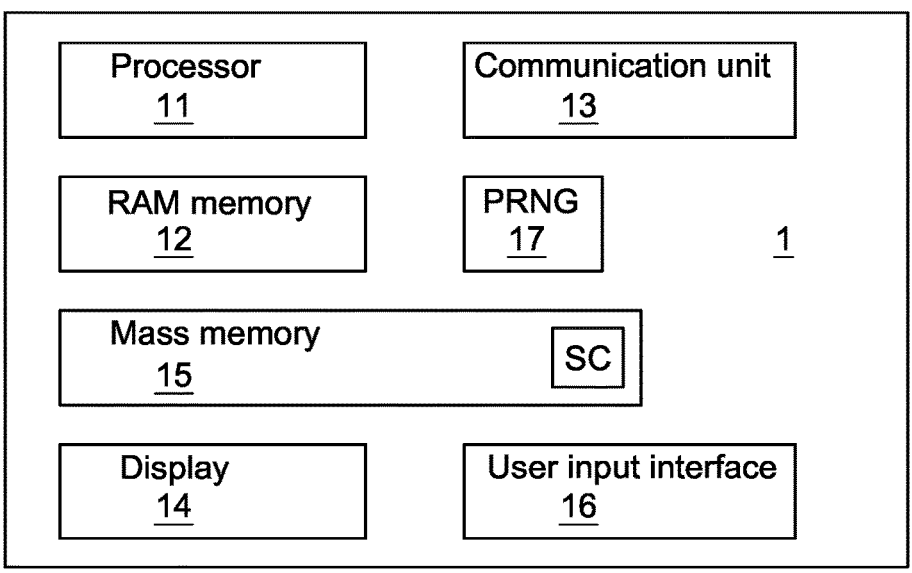
FIG. 1 is a schematic illustration of a cryptographic device according to an embodiment of the present invention.

Such a method according to a first aspect is performed by a processor 11 of a cryptographic device 1. Such a cryptographic device 1 may be any electronic device including a processor For example it may be a personal computer PC, a smartphone, a smartcard, a hardware security module (HSM) . . . . FIG. 1 describes an exemplary embodiment of such a cryptographic device 1 comprising a processor 11, a RAM memory 12, a communication unit 13 such as an Ethernet or Wifi network adapter, a display 14, a mass memory 15 such as a hard drive or flash memory, and a user input interface 16. The cryptographic device may also comprise a random number generator (PRNG) 17. The software code of the algorithm of a cryptographic process to be executed may be stored on the mass memory 15 of the securing device.

The cryptographic process to be performed may for example be an encryption or decryption process, a signature issuance or verification process. The algorithm to be executed may for example be a block cipher algorithm such as DES or AES, a stream cipher, or an asymmetric cryptographic algorithm such as RSA. In the rest of this document, assumption is made that the algorithm to be executed comprises n operations $O_j$, with n and j integers and j in [0 . . . n−1], which may be executed independently and that each of these operations must be executed once for a complete execution of the algorithm, without taking into account additional executions performed for securing the execution according to the invention. Said otherwise, if the native algorithm comprises an operation that must be executed multiple times between the beginning and the end of the execution of the algorithm, each mandatory execution of the operation will be considered in the following paragraphs as a separate operation to be executed once. For example, if the algorithm includes an addition operation to be executed twice, it will be considered that the algorithm comprises two identical separate addition operations, each to be executed once. In the case of a block cipher algorithm, the operations to be executed may for example be operations of a given round of the block cipher algorithm, such as Sboxes and Tboxes.

Figure 2:
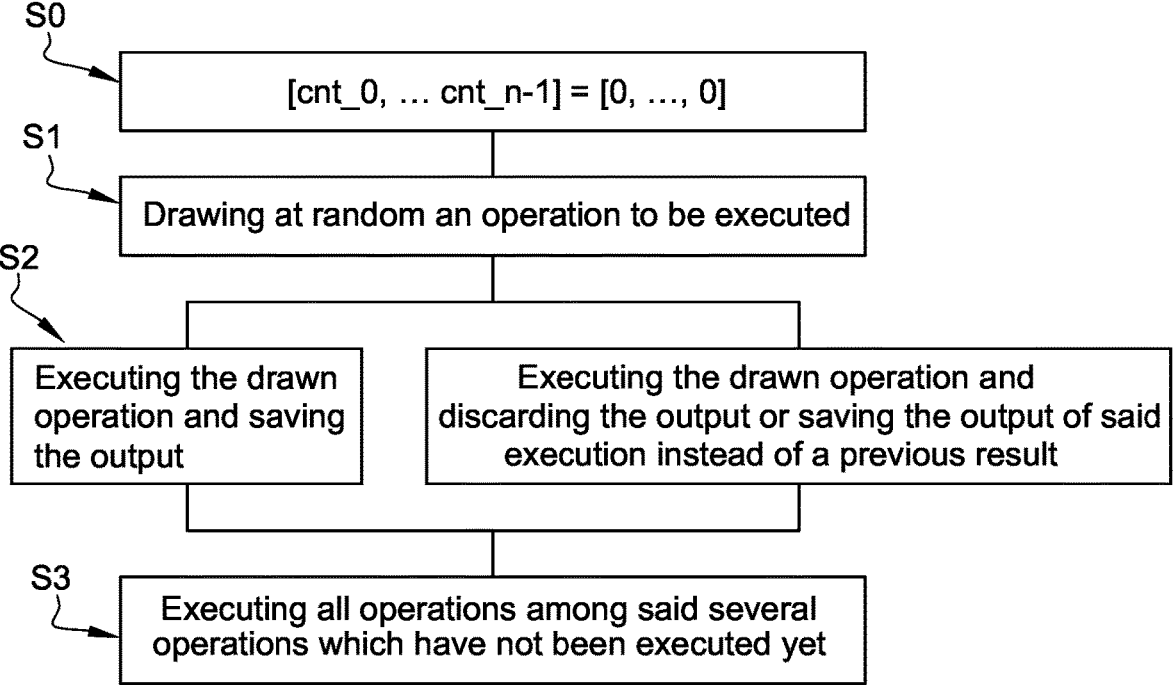
FIG. 2 illustrates schematically a method for securing an execution of an algorithm of a cryptographic process according to an embodiment of the present invention.

The next paragraphs describe with more details the steps of the method according to the invention, as depicted on FIG. 2. The following steps are repeated since the start of the execution of the algorithm and until each of the several operations of the algorithm has been executed at least once.

In a first step S1, the processor 11 draws at random an operation to be executed among all several operations comprised in the algorithm. The drawn operation may be any of the operations of the algorithm, included an operation which has already been executed since the beginning of the execution of the algorithm.

In a second step S2, the processor executes the drawn operation. Such an operation may already have been executed. Consequently, such an execution may comprise:

when the drawn operation has never been executed yet since the beginning of execution of said algorithm, the processor executes the drawn operation and saves an output of the execution, for example in the RAM memory or the mass memory of the cryptographic device. In this case, this first execution is the mandatory execution required for correctly executing the algorithm and the output of this execution is needed for producing the final output of the algorithm as a whole;

when the drawn operation has already been executed since the beginning of the execution of the algorithm, the processor executes the drawn operation and may discard the output of said execution or it may save the output of the execution instead of a previous result of a previous execution of the drawn operation. In such a case this additional execution is just performed in order to confuse an attacker and its output is not needed for the correct execution of the algorithm and may therefore be discarded but it may also just overwrite a previous result in order to keep constant the behavior of the cryptographic device.

By doing so, each operation may be repeated a random number of times which makes the order of execution of the operations and the length of execution of the algorithm completely unpredictable for an attacker.

Figure 3:
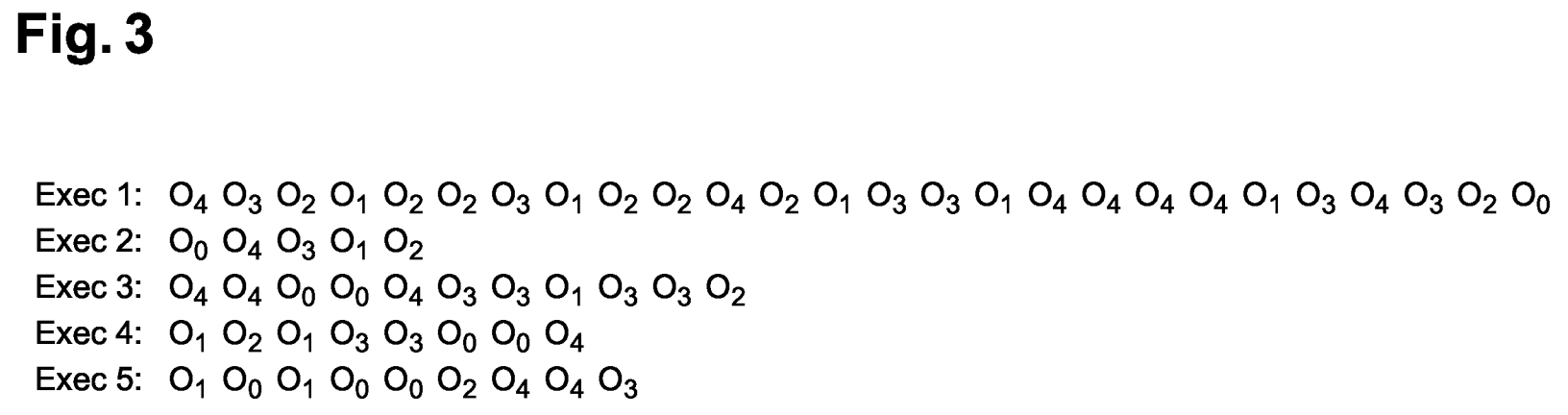

An example of execution of an algorithm according to the method of the invention is shown on FIG. 3. In this example, the algorithm comprises five operations $O_0, O_1, O_2, O_3$ and $O_4$. FIG. 3 shows five different executions of the algorithm. In the first execution, 26 operation executions are performed before all the five operations have been performed. Some operations $O_2$ and $O_4$ are executed 7 times. The second execution is the shortest possible since all the 5 operations are only executed once. Executions 3, 4 and 5 are of intermediate length with respectively 11, 8 and 9 operation executions. From one algorithm execution to another, the order of execution of the operations is never the same and the number of repetitions of each operation varies a lot.

In order to draw an operation to be executed, the first step S1 may comprise a generation of a random index idx in $[0 \ldots n-1]$ with n an integer, using the PRNG 17. And in the second step S2, executing the drawn operation may comprise executing the operation $O_{idx}$ whose index is equal to the generated index idx.

The method according to the invention may comprise an initialization step S0, performed at the beginning of the execution of the algorithm, during which sets the processor, for each of the operations of the algorithm, sets to zero a counter cnt_j of execution of the operation Oj: [cnt_0, . . . cnt_n–1]=[0, . . . , 0].

In a first embodiment, such counters are used to count the number of executions of each operation. In such a case, the second step S2 may comprise incrementing the counter cnt_idx of the number of executions of the executed operation $O_{idx}$. After each execution of an operation it must be checked if all the operations have been executed in order to decide if the execution of the algorithm is complete or if operations must still be executed. When such a way of counting the number of executions of the operations is performed, it can be considered that each of the operations of the algorithm has been executed at least once when all counters are different from zero.

In a second embodiment, such counters are binary values meant to memorize for each operation if it has already been executed since the beginning of execution of the algorithm, whatever the number of times the operation has been executed. For example a counter can be set to 0 when the operation has not been executed yet and set to 1 when it has already been executed. In such a case, the second step S2 may comprise incrementing the counter cnt_idx of the number of executions of the executed operation $O_{idx}$ only when the operation has never been executed yet since the beginning of execution of said algorithm, that is to say when the counter is still equal to 0. In order to perform such an incrementation only when the counter is still equal to 0, an OR operation may be applied between the counter cnt_idx and the value 1. In order to determine if all the operations have been executed, all counters may be concatenated into a binary value, and after executing an operation, it can then be considered that each of the operations of the algorithm has been executed at least once when such a binary value is equal to a predetermined binary value composed only of digits equal to 1. For example when the algorithm comprises 32 operations, it can be checked if such a binary value is equal to 0xFFFFFFFF. When the counters are concatenated in such a way, incrementing the counter cnt_idx only when the counter is still equal to 0 may be performed by applying a OR operation between the concatenated value and a binary value comprising 0 digits and a single 1 digit at a position corresponding to the position of cnt_idx in the concatenated value.

Continuously drawing randomly the next operation to be executed may lead to a very long execution time of the cryptographic process. In order to prevent an excessive execution time, the method may comprise a termination step S3 which is triggered when a predetermined number of executions of operations have been performed, and during which the processor executes all the operations among the several operations of the algorithm which have not been executed yet since the beginning of execution of said algorithm. By doing so, all the remaining operations are executed without executing anymore an already executed operation and the number of operation executions before completing the algorithm execution is limited.

During such a termination step, the operations may be executed in a random order, or they may be executed in a predetermined order, for example according to their index.

In an implementation of the method using such a termination step, the maximal number Nopmax of operations to be executed before the termination step is executed is predetermined. In such a case, instead of drawing the next operation to be performed after the end of the execution of an operation, i.e. instead of repeatedly performing the first step S1, then the second step S2, then the first step S1, then the second step S2 etc . . . , all the operations to be executed may be drawn before executing any operation, i.e. the first step S1 may be repeated Nopmax times in order to draw Nopmax operations and then the second step S2 may be repeated until all operations have been executed once or until Nopmax operations have been executed.

According to a second aspect, this invention therefore relates also to a computer program product directly loadable into the memory of at least one computer, comprising software code instructions for performing a method according to the first aspect when said computer program product is run on the at least one computer.

According to a third aspect, this invention therefore relates also to a non-transitory computer readable medium storing executable computer code that when executed by a cryptographic device comprising a processor, performs the method according to the first aspect.

According to a fourth aspect, this invention therefore relates also to a cryptographic device comprising a processor configured to execute a method according to the first aspect.

Such a solution enables to make the execution of a plurality of independent sensitive operations of an algorithm completely chaotic, making it impossible for an attacker to predict any execution pattern and to be aware during execution of the next operation to be executed. It therefore enables to secure the execution of any of such sensitive operations in a white-box context.

The invention claimed is:

1. A method for securing a cryptographic device operating in a white-box context including a processor and memory executing an algorithm of a cryptographic process comprising several operations Oj with $n, j$ integers and j in $[0 \ldots n{-}1]$, to be executed each once for a complete execution of said algorithm and which may be executed independently, the method securing the cryptographic device against attacks aimed at discerning data stored at memory locations in said memory of the cryptographic device for storing results of the several operations Oj, said method being performed by said processor of the cryptographic device comprising further a random number generator, and said method comprising:

for one execution of said algorithm, to make the order of execution of the operations and length of execution of said algorithm unpredictable, repeating the following steps, until each of said several operations has been executed at least once:

drawing at random an operation to be executed among all several operations comprised in the algorithm using said random number generator, executing said drawn operation wherein executing said drawn operation comprises:

when said drawn operation has never been executed yet since the beginning of execution of said algorithm, executing said drawn operation and saving an output of said execution of said drawn operation in the memory location for storing the output of said drawn operation in the memory of the cryptographic device, when said drawn operation has already been executed since the beginning of execution of said algorithm, executing said drawn operation and discarding the output of said execution or saving the output of said execution instead of a previous result of a previous execution of said drawn operation in the memory location for storing the output of said drawn operation in the memory of the cryptographic device.

2. The method of claim 1, wherein said cryptographic device comprises further a memory configured for storing counters, and comprising, at the beginning of an execution of said algorithm, for each of said operations Oj, setting to zero a counter of a number of executions of said operation, and wherein:

drawing at random an operation to be executed comprises generating a random index in $[0 \ldots n{-}1]$, using said random number generator and, executing said drawn operation comprises executing an operation whose index is equal to said generated index and incrementing said counter of the number of executions of said operation, wherein each of said several operations has been executed at least once when all counters are different from zero.

3. The method of claim 1, wherein said cryptographic device comprises further a memory configured for storing counters, and comprising, at the beginning of an execution of said algorithm, for each of said operations Oj, setting to zero a counter of a number of executions of said operation, and wherein:

drawing at random an operation to be executed comprises generating a random index in $[0 \ldots n{-}1]$, using said random number generator and, executing said drawn operation comprises executing an operation whose index is equal to said generated index and incrementing said counter of the number of executions of said operation only when said operation has never been executed yet since the beginning of execution of said algorithm, wherein, all counters being concatenated into a binary value, each of said several operations has been executed at least once when said binary value is equal to a predetermined binary value composed only of digits equal to 1.

4. The method of claim 1, wherein said method comprises a step of, when a predetermined number of executions of operations have been performed, executing all operations among said several operations which have not been executed yet since the beginning of execution of said algorithm.

5. The method of claim 4, wherein: all operations among said several operations which have not been executed yet since the beginning of execution of said algorithm are executed in a random order or a predetermined order.

6. The method of claim 1, wherein said algorithm of a cryptographic process is a block cipher algorithm and said several operations are operations of a round of said block cipher algorithm.

7. The method of claim 6, wherein said operations are among Sboxes and Tboxes.

8. A computer program product directly loadable into a memory of at least one computer, comprising software code instructions for performing a method according to claim 1, when said computer program product is run on the at least one computer.

9. Cryptographic device comprising a random number generator and a processor configured to execute the method according to claim 1.

* * * * *